United States Patent

[11] 3,574,889

| [72] | Inventors | Charles H. Hire<br>Ridgecrest;<br>Elmer J. Rhyn, China Lake, Calif. |
|---|---|---|
| [21] | Appl. No. | 776,448 |
| [22] | Filed | Nov. 18, 1968 |
| [45] | Patented | Apr. 13, 1971 |
| [73] | Assignee | The United States of America, as represented by the Secretary of the Navy |

[54] MULTIPORT EXTRUDING DIE
2 Claims, 3 Drawing Figs.

[52] U.S. Cl. .................................................. 18/8, 18/14
[51] Int. Cl. ................................................... D01d
[50] Field of Search ......................................... 18/8 (SC), 11 (SP), 12 (DM), 12 (M), 12 (R) (Cursory), 14 (M), 14 (V)

[56] References Cited
UNITED STATES PATENTS

| 2,194,589 | 3/1940 | Kunz | 18/8SCUX |
| 2,629,898 | 3/1953 | Orsini | 18/12DMUX |
| 3,121,254 | 2/1964 | Heynen et al. | 18/8SCUX |

Primary Examiner—Andrew R. Juhasz
Assistant Examiner—Leon Gilden
Attorneys—Edgar J. Brower and Roy Miller ABSTRACT: A multiport extruding die for forming plastic material into tubular shape; said die provided with a plurality of ports of predetermined dimensions having a spring steel stake or mandrel positioned centrally in each port. In operation the material is extruded or squeezed through the port around the mandrel or stake thereby forming a plurality of tubules in a single operation; each tube having a uniform central perforation and uniform wall thickness.

Patented April 13, 1971

3,574,889

INVENTORS.
ELMER J. RHYN
CHARLES H. HIRE
BY
ROY MILLER
ATTORNEY.

MULTIPORT EXTRUDING DIE

GOVERNMENT INTEREST

The invention described herein may be manufactured and used by or for the Government of the United States of America for governmental purposes without the payment of any royalties thereon or therefor.

BACKGROUND OF THE INVENTION

In the extrusion of plastic materials to produce tubular articles, the material is pushed or squeezed through a single-port die having a mandrel positioned and held therein by means of a spider or stake holder. The spider or stake holder comprises a plurality of arms extending radially from a hub, and a ring member connecting the ends of said arm. The mandrel is attached to the downstream end and the material being extruded is parted as it flows around the arms of the spider and reunites after passing the arm to form a straight line of cleavage into the single port. A single-port die of this general type will produce single tubular strands at about 40 inches per minute. Although the above-described device serves the purpose, the need exists for a die for use in extruding plastic and/or extrudable hazardous material into tubular lengths in quantity for use in the rocket propellant and explosives development fields. The device should be of a type which produces greater quantity at greater speeds in a safe and efficient manner, while at the same time producing a tubular length having uniform wall thickness and uniform diameter therethrough. The present invention supplies this need.

SUMMARY OF THE INVENTION

The present invention relates to a multiport extruding die for use in extruding in tubular form hazardous materials, more particularly, for the extrusion of nonsolvent propellant and/or explosive powder compositions.

The general purpose of this invention is to provide an improved die for use in extruding a single perforated length of propellant grain or explosive charge in large quantities having small uniform diameter and uniform wall thickness. Another object is to provide an apparatus for extruding a plastic material having good mechanical strength. Other aspects, advantages and objects of this invention will be apparent when considered in connection with the accompanying drawing.

DESCRIPTION OF THE INVENTION

Figure 2:
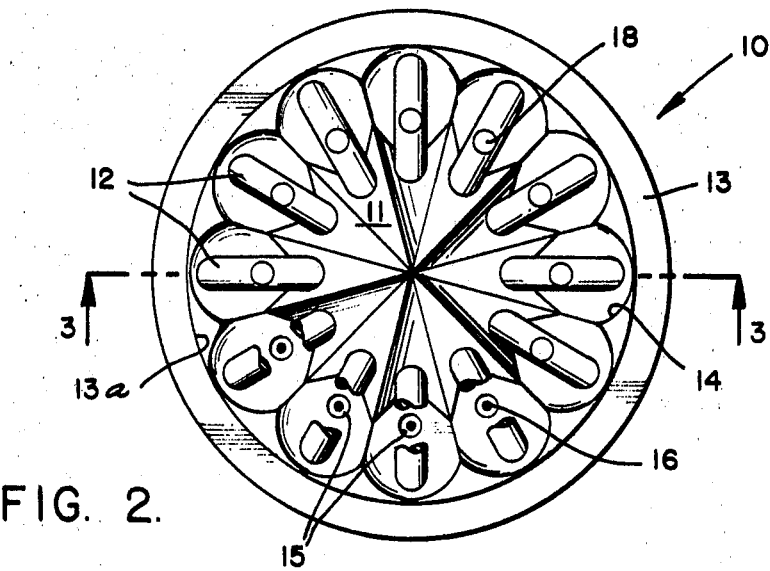
FIG. 2 is a detailed view in section through the base of the die.
Figure 3:
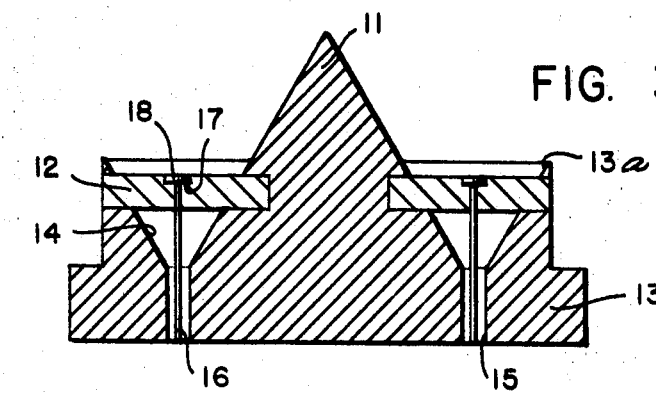
FIG. 3 is a cross section of the die taken along lines 3—3 of FIG. 2.
Figure 1:
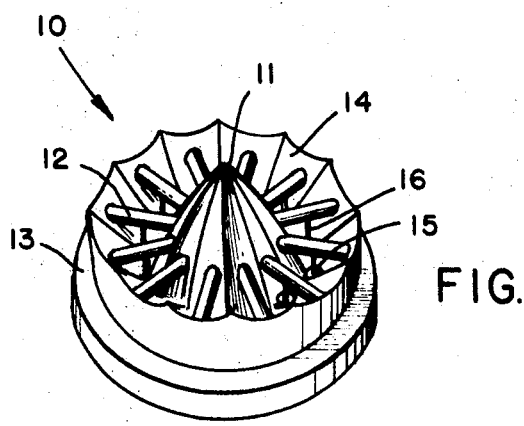
FIG. 1 is a slanted view of the downstream face of the die.

Referring now to the drawing the invention will be more fully explained. In FIG. 1, there is shown in slanted view the downstream face of die 10. As shown in detail in FIG. 2 die 10 comprises a steel plate 13 provided with 12 orifices or ports 15 of equal size, equally spaced around the periphery of said plate 13. Twelve arm members designated generally by numeral 12 extend radially from hub 11 to the downstream edge or periphery designated 13a of said plate 13. The downstream edge of plate 13 is provided with a plurality of tapered grooves 14 which extend to a point about intermediate from said downstream periphery of said plate 13. Arm members 12 are rounded and concentrically arranged around said hub 11, one end of each arm 12 being recessed in hub 11 and the other end being recessed in the downstream edge or periphery 13a of said plate 13. Each arm passes across the center of each port or orifice 15. A stake or mandrel 16 is positioned in the center of each port 15 being held in place by arm member 12. In FIG. 3 it is shown that stake 16 is provided with a head 18 which fits into a counterbore designated generally by numeral 17 provided in each arm member. Stake or mandrel 16 which is formed of spring steel is easily and quickly removed from arm member 12 if damaged during the extrusion process.

In operation the die was fitted to a small extrusion press (not shown). The plastic material extruded was a high explosive composition comprising a mixture of HMX (cyclotetramethylenetetranitramine), magnesium and Viton-Teflon binder. The explosive was forced or squeezed continuously over and around arm members 12 into ports 15 and around stake or mandrel 16 to produce lengths of tubular explosive which was then cured. The tubes, looking like ropes of spaghetti, are used in an ordinance flare system. The tubular lengths of explosive were ⅛-inch diameter which had uniform wall thickness and uniform perforations throughout. Where a single port die has previously produced 40 inches of tubular material per minute, the present die produced 480 inches of tubular material per minute.

This invention is also applicable to the production of quantities of tubular propellant grains of any size for complex rocket motor designs. Propellant compositions comprising a binder or fuel component as the continuous phase having an oxidizer salt dispersed therein are easily extruded. Typical of this type comprises a solid oxidant such as ammonium nitrate or ammonium perchlorate, a metal fuel such as aluminum or magnesium; and a rubbery binder material such as a copolymer of butadiene and a vinylpyridine or other substituted heterocyclic nitrogen base compound which after extrusion is cured so that the resulting tubular product has good mechanical properties such as high values of elongation and tensile strength and low values of modulus of elasticity. All these ingredients can be mixed on a Baker-Perkins dispersion blade mixer, or the like. The binder forms the continuous phase of the finished propellant and the fuel, oxidant and other additives form the discontinuous phase.

Other plastic type hazardous materials such as those used in pyrotechnics have been successfully extruded in varying diameters determined by the device in which they were used.

We claim:

1. A die for simultaneously extruding a plurality of tubular lengths of plastic material, said die comprising:

a circular steel plate provided with a plurality of ports of equal size equally spaced around the periphery of said plate; each of said ports comprising a main passageway terminated by the downstream end on one side of said plate and an outlet on the other side;

a spring steel stake positioned centrally in each port;

means for holding said stake in each of said ports; said means comprising a hub positioned in the center of the downstream portion of said plate, and a plurality of arm members having one end recessed in said hub and the other end recessed in the downstream periphery of said plate; said arm members extending radially around said hub and each arm positioned so as to pass over the center of each of said ports; said arm member being provided with a counterbore for holding said stake in place in said port;

a plurality of tapered grooves alternately disposed with respect to each other along the downstream periphery of said plate, each of which is provided with a recess for the reception of one end of an arm member.

2. A multiport extruding die for forming hazardous material in tubular form which consists of:

a circular-shaped steel base plate adapted to fit an extrusion press;

a plurality of ports of equal size disposed equidistant from each other around the circumference of said plate;

a plurality of tapered grooves alternately disposed with respect to each other along the downstream periphery of said plate; said grooves being equal in number to said ports and each groove forming a passageway into each of said ports on said downstream side;

a cone-shaped steel hub disposed in the center of the downstream side of said plate; said hub being provided with a plurality of grooves equal in number to said ports which form a passageway into each of said ports;

a plurality of rounded arm members equal in number to said ports positioned radially around said hub, one end of each member being secured to said hub and the other end being secured to the periphery of said plate; each said arm member being disposed across the center of each of said ports;

a counterbore disposed in each of said arm members so as to be centered over each port; and a spring steel stake provided with a head on one end slidably positioned in said counterbore, said stake being centrally disposed in said port.